US008645159B1

(12) United States Patent
Juneau et al.

(10) Patent No.: US 8,645,159 B1
(45) Date of Patent: Feb. 4, 2014

(54) SYSTEM AND METHOD OF NOTIFYING HEALTHCARE PROVIDERS OF FINANCIALLY DELINQUENT PATIENTS

(75) Inventors: Wendell J. Juneau, Lafayette, LA (US);
Mark G. Fontenot, Lafayette, LA (US);
Jared S. Tessier, Lafayette, LA (US);
Scott W. Thomas, Lafayette, LA (US);
Wendt L. Withers, Lafayette, LA (US);
Lawrence C. Billeaud, Lafayette, LA (US)

(73) Assignee: CirraGroup LLC, Lafayette, LA (US)

( * ) Notice: Subject to any disclaimer, the term of this patent is extended or adjusted under 35 U.S.C. 154(b) by 0 days.

(21) Appl. No.: 12/886,058

(22) Filed: Sep. 20, 2010

Related U.S. Application Data

(60) Provisional application No. 61/243,870, filed on Sep. 18, 2009, provisional application No. 61/315,303, filed on Mar. 18, 2010.

(51) Int. Cl.
*G06Q 10/00* (2012.01)
*G06Q 50/00* (2012.01)
*A61B 5/00* (2006.01)
*G06F 19/00* (2011.01)

(52) U.S. Cl.
USPC .................................................. 705/2; 705/3

(58) Field of Classification Search
USPC ........................................................ 705/2–3
See application file for complete search history.

(56) References Cited

U.S. PATENT DOCUMENTS

| 2002/0198824 | A1* | 12/2002 | Cook | 705/38 |
| 2003/0093289 | A1* | 5/2003 | Thornley et al. | 705/1 |
| 2004/0111292 | A1* | 6/2004 | Hutchins | 705/2 |
| 2004/0153405 | A1* | 8/2004 | Millary et al. | 705/40 |
| 2007/0198336 | A1* | 8/2007 | Thompson | 705/14 |

OTHER PUBLICATIONS

NDCHealth, Medisoft User Manual, Feb. 2006 , NDCHealth, Version 11.*
NDCHealth, Medsoft User Manual, Feb. 2006, NDCHealth, Version 11.*
Sullivan, The Doctor Will See Your Credit Now, Jan. 2008, redtape.msnbc.com.*

* cited by examiner

*Primary Examiner* — Joy Chng
(74) *Attorney, Agent, or Firm* — Gregory & Sawrie LLP

(57) ABSTRACT

Embodiments provide for tracking and notifying healthcare providers of financially delinquent patients. A platform includes or is coupled to a database including identifying data of patient debtors who have been financially delinquent in a healthcare transaction with a healthcare provider. The identifying data includes patient and financial identification data of the transaction. A fee is received from a subscriber (healthcare provider) that enables the subscriber to electronically access the platform. The identifying data of patient debtors is provided to the subscriber via the platform. New identifying data of patient debtors is received at the platform from a contributing subscriber (healthcare provider). The new identifying data is identifying data of a new patient debtor and/or a new healthcare transaction of an existing patient debtor. A discount is automatically applied to the fee of the contributing subscriber in response to the new identifying data.

36 Claims, 4 Drawing Sheets

| | |
|---|---:|
| Healthcare Provider Number | 246810 |
| Patient Debtor Social Security Number | 123-45-6789 |
| Database Entry Date of Patient Debt | 17-Sep-10 |
| Amount of Patient Debt | $ 750.00 |
| Accured Interest | $ - |
| Total Amount of Patient Debt | $ 750.00 |

FIGURE 4

SYSTEM AND METHOD OF NOTIFYING HEALTHCARE PROVIDERS OF FINANCIALLY DELINQUENT PATIENTS

RELATED APPLICATION

This application claims the benefit of U.S. Patent Application No. 61/243,870, filed Sep. 18, 2009.

This application claims the benefit of U.S. Patent Application No. 61/315,303, filed Mar. 18, 2010.

TECHNICAL FIELD

The present invention relates to electronically notifying healthcare providers of patients who have in the past been financially delinquent in their dealings with one or more other healthcare providers.

BACKGROUND

Healthcare providers have learned that certain patients have a propensity to not pay for healthcare related services. These patients often see a number of different healthcare providers, failing to satisfy financial obligations to one or more of them. Conventional systems used by healthcare providers include systems and methods for credit evaluation, healthcare related services and payment for said services, payment management, and collection of delinquent debts that are related to healthcare service providers. However, conventional systems do not address notifying healthcare providers of patients who have been financially delinquent in one or more patient care related transactions with another healthcare provider.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 4 is an example of patient information of the system database, under an embodiment.

DETAILED DESCRIPTION

Figure 1:
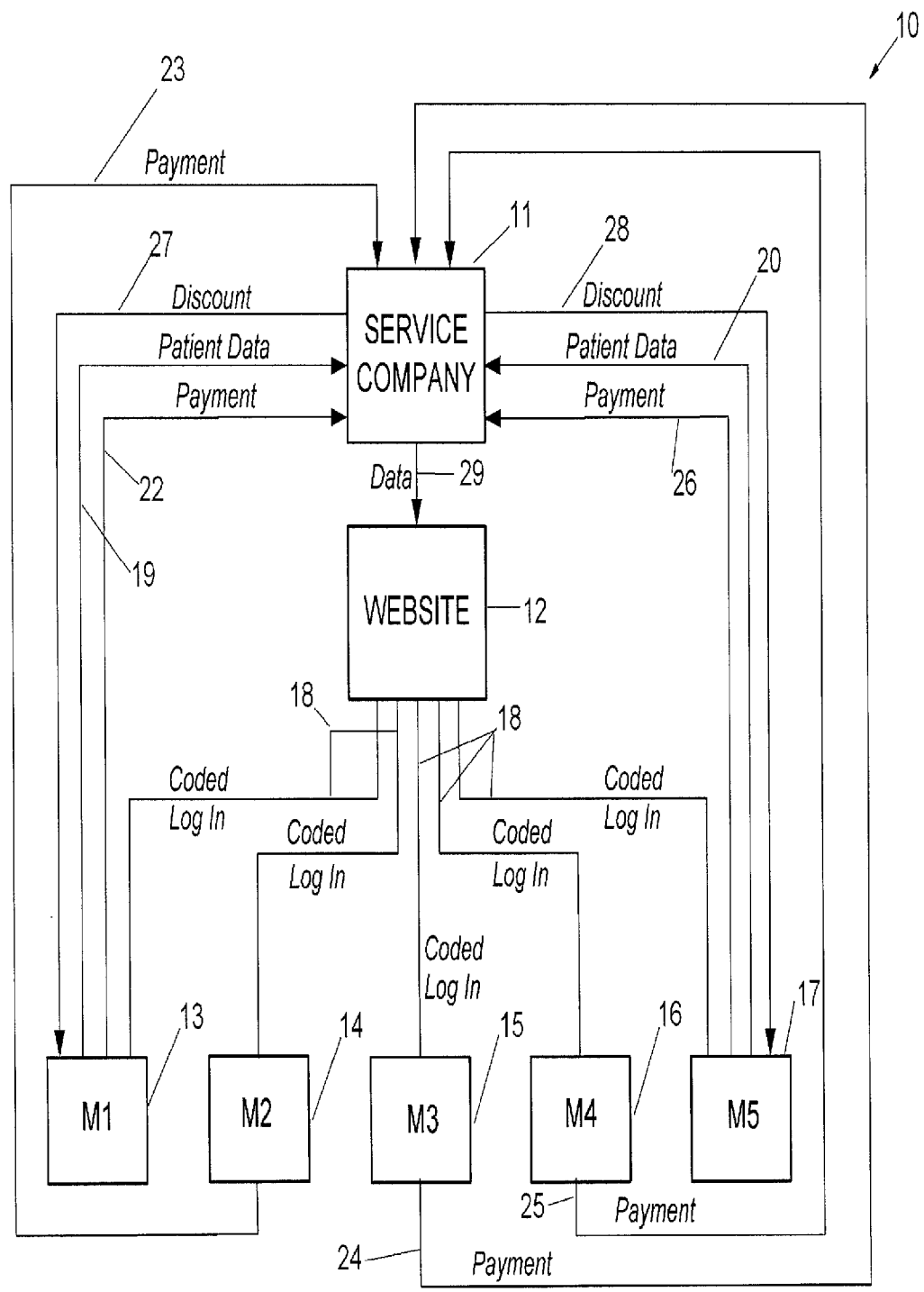
FIG. 1 is a block diagram of an example system for tracking financially delinquent patients and notifying healthcare providers of financially delinquent patients, under an embodiment.

Embodiments described herein provide systems and methods for notifying healthcare providers of patients who have been financially delinquent in one or more patient care transactions with healthcare providers. Generally, a service platform including or coupled to a database is accessible via an Internet website hosted by a service company or provider. The database includes data of patient debtors who have previously been financially delinquent in one or more patient care related transactions with one or more healthcare providers. Subscribing healthcare providers, also referred to herein as subscribers or members, pay a fee for accessing the information via the website and service platform. Each contributing subscriber that contributes data to the database of financially delinquent patients receives a credit toward the membership fees or other fees that are collected by the platform.

Embodiments enable only authorized subscribers to access the database via the website and platform. Each subscriber pays a membership fee to the service company for the privilege of accessing the database. The membership fee can be a periodic subscription fee (e.g., monthly fee, yearly fee, etc.), a transaction fee charged per transaction (each time the subscriber accesses the database the individual request is billed on a per click/use basis), or a combination of a subscription fee and a transaction fee. Regardless of the type of membership fee charged, the membership fee can be a fixed fee, a variable fee, or a combination of fixed and variable fees.

Embodiments of the systems and methods encourage subscribers to contribute new information to the database (service company), where the new information identifies additional patient debtors that are financially risky. This new information can include the name and address of one or more new financially risky patients in addition to the amount of any outstanding unpaid balance for healthcare services administered. A subscriber that reports new information to the service company that identifies a particular new patient debtor as a financial risk is rewarded with a discount that lowers the membership fee (e.g., subscription fee and/or transaction fee) charged that subscriber.

Embodiments include a web-based data resource or management platform that provides healthcare providers a mechanism to limit treatment of non-paying patients. An embodiment is supported by a contract between each healthcare provider and the healthcare credit service company or other third party hosting the service platform. The subscriber pays a membership fee for the service (e.g., yearly fee, with the first year free, etc.). Payments from a subscriber serve to open an account, create an account, and maintain an account for that subscriber. The payments of an embodiment are in the form of electronic transmissions, automatic debit or credit card transactions, and/or direct withdrawal from a subscriber-identified account. A statement of debits/withdrawals from a subscriber account is electronically provided to each subscriber on a periodic basis (e.g., weekly, monthly, quarterly, etc.). The website is secure and available for limited viewing by subscribers only, and includes mechanisms to protect the security/identity of both subscribing healthcare providers and debtor-patients.

Embodiments herein effect the provision of notice to healthcare providers regarding whether potential and/or new patients are a financial risk by having subscribers input or upload identification information of delinquent patients on a periodic basis (e.g., daily, weekly, monthly, etc.) to the service platform for each new patient it deems to be a financial risk to other healthcare providers. The information uploaded for a delinquent patient can include, for example, social security number and the amount of indebtedness, but is not so limited. The healthcare provider is given a partial financial credit towards its membership fees in exchange for information provided relative to new non-paying patients.

Each healthcare provider has a secure and unique access code for the website, with tracking mechanisms within the database to identify the source of the information received. Similarly, the patients are identified by a patent identification number (e.g., social security number, assigned identification number, etc.). In an embodiment, each subscriber receives a monthly report that includes a summary of information related to delinquent patient debtors. Negative financial reports are removed from the data base within a specified period of time (e.g., 24 hours) within receiving notice of final payment on account from the creditor/healthcare provider.

Each subscriber pays a membership fee to the service company, and the subscriber is then allowed to access the database to verify which patient debtors have been financially delinquent or are financially risky. In an embodiment, a subscriber pays a periodic fee (e.g., monthly, yearly, etc.) or fee based upon a flat rate. In another embodiment, a subscriber pays a fee each time that subscriber accesses the database. In yet another embodiment, a subscriber pays both a periodic fee and an access fee each time that subscriber accesses the database. Regardless of the fee structure under which a subscriber is billed, the subscriber obtains a discount that lowers the fees in exchange for the reporting of information evidencing that a particular patient debtor presents a financial risk for other subscribers. The information contributed can include the amount of an unpaid indebtedness. The database is updated periodically (e.g., daily, weekly, etc.) to remove information of any patient debtor who has satisfied his or her indebtedness to a subscriber for a past healthcare related transaction. For at least some patients included in the database, the database includes a monthly summary of debits and withdrawals from an account.

FIG. 1 is a block diagram of an example system 10 for tracking information of and notifying healthcare providers of financially delinquent patients, under an embodiment. The system 10 includes a service platform 11 that is coupled to or includes a website 12 (e.g., network-based website, Internet-based website, etc.). The service platform 11 is hosted by a service provider that is a third party company. A number of subscribers are coupled to the platform 11 via the website 12 such that the subscribers can access a database of the service platform that includes patient information The patient information in the database includes, but is not limited to, one or more of the names, addresses, and past account data for patients who have been identified as financially delinquent. For example, the patient information can include information of patient Jane Doe that includes one or more of her address, telephone number, dates healthcare services were rendered, and any outstanding amounts not paid to the healthcare providers. As another example, the patient information can include information of patient John Smith that includes one or more of his address, telephone number, previous healthcare providers who have rendered healthcare services to John Smith, dates healthcare services were rendered, and any outstanding amounts not paid to the healthcare providers.

In the example system 10, five subscribers or users (M1-M5) 13, 14, 15, 16, 17 are coupled or linked 18 to the platform 11 via the website 12, but the embodiment is not limited to five subscribers. The link 18 enables each subscriber 13-17 to access the website 12 and its database, and the transfer of patient information between the subscribers 13-17 and the database occurs over the link 18. Access to the database is accomplished with a coded login such that each subscriber 13-17 is given a different, confidential password or code. When the subscriber 13-17 accesses the platform 11 via website 12, that subscriber (such as subscriber 13) is able to obtain information included in the database via the website 12. A data transfer 29 occurs between the platform 11 and the website, and this supports provision of information to the subscribers 13-17.

Each of the subscribers 13-17 pays a fee 22-26 (e.g., yearly, monthly, per-access, other agreed fee, etc.) to the service company as a prerequisite to accessing the platform 11. This fee payment 22-26 can be a fixed or variable payment per time period. Additionally or alternatively, the payment 22-26 can also be a payment that is due each time that a subscriber or user 13-17 accesses the database of the website 12.

Subscribers 13-17 of an embodiment provide updated data to the service platform 11 via the website 12, and the updated data is added to the information of the database. When a subscriber 13-17 does supply such updated information, that subscriber 13-17 receives a discount. In the example system 10, there is an example transfer of data 19 from subscriber 13 to the service company 11. Another example is a transfer of patient data 20 from the subscriber 17 to the service platform 11. By providing a discount 27, 28, each subscriber 13-17 is encouraged to help maintain a current and updated database for the website 12. This updated information of patient data 19, 20 insures updated information for all of the subscribers 13-17.

Figure 2:
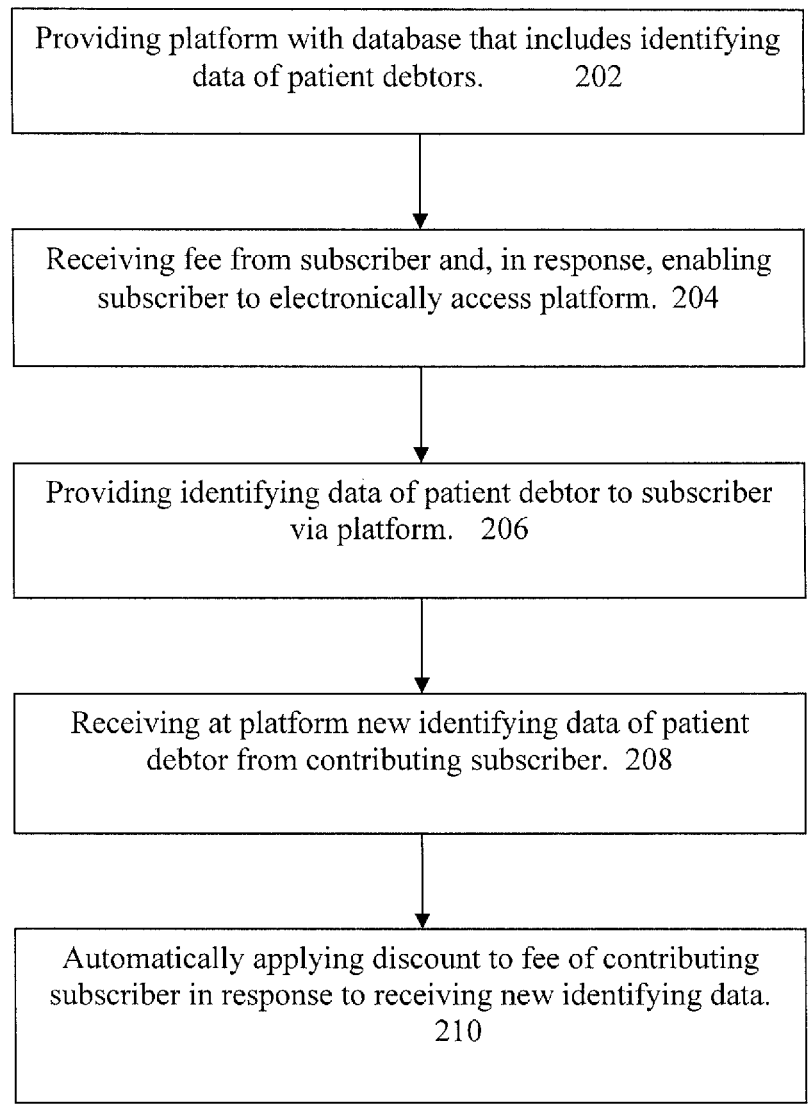
FIG. 2 is a flow diagram for tracking and notifying healthcare providers of financially delinquent patients, under an embodiment.

FIG. 2 is a flow diagram for tracking and notifying healthcare providers of financially delinquent patients 200, under an embodiment. Embodiments provide a platform with a database that includes identifying data of patient debtors 202. The patient debtors are patients who have been financially delinquent in at least one healthcare transaction with at least one of a number of healthcare providers. The identifying data includes patient identification data and financial data of the at least one healthcare transaction. Embodiments receive at least one fee from a subscriber and, in response, enable the subscriber to electronically access the platform 204. The subscriber is a healthcare provider of the plurality of healthcare providers. Embodiments provide the identifying data of at least one patient debtor to the subscriber via the platform 206. Embodiments receive at the platform new identifying data of at least one patient debtor from a contributing subscriber of the healthcare providers 208. The new identifying data of the at least one patient debtor is identifying data of at least one of a new patient debtor and a new healthcare transaction of an existing patient debtor corresponding to at least one healthcare transaction with the contributing subscriber. Embodiments automatically apply a discount to the at least one fee of the contributing subscriber in response to receipt of the new identifying data 210.

Figure 3:
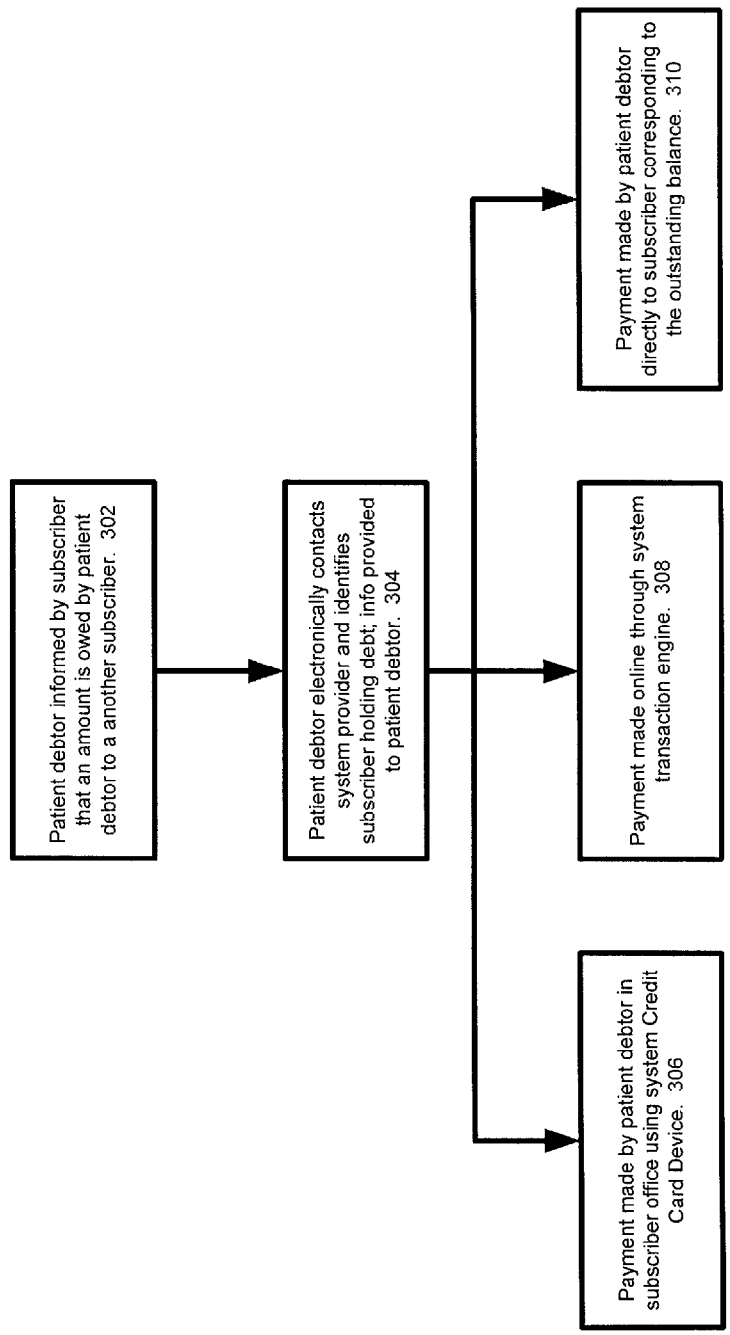
FIG. 3 is a flow diagram for facilitating and collecting payment from a patient debtor on behalf of a subscriber, under an embodiment.

The system 10 for tracking information of and notifying healthcare providers of financially delinquent patients includes a transaction engine for the patient debtor database, but is not so limited. FIG. 3 is a flow diagram 300 for facilitating and collecting payment from a patient debtor on behalf of a subscriber, under an embodiment. Once a healthcare provider subscriber has identified a patient as owing a balance to another healthcare provider subscriber 302, the identified patient debtor can electronically contact (e.g., electronic link, network connection, electronic mail, telephone call, etc.) the service provider to identify the subscriber to which the patient debtor owes the outstanding balance 304. During the electronic contact or session, the patient debtor confirms their identity with their name and social security number (can include additional identifying information (e.g., date of birth, etc.)). The system database includes but is not limited to the subscriber's identification, the patient debtor's Social Security number, the date the debt was entered into the data base, and the amount of the debt, for example. The service provider identifies the name and/or other contact information (e.g., telephone, address, etc.) of the healthcare provider subscriber corresponding to the amount owed by the patient debtor and provides this information to the patient debtor.

The system of an embodiment provides the patient debtor with a number of payment options 306-310 if the patient debtor elects to pay some or all of the balance owed to the subscriber. Under one payment option, the patient debtor can make a payment at the subscriber's office in which the patient debtor is seeking treatment; under this option the patient debtor can use a credit card payment terminal provided by and coupled to the system 306. Under another payment option, the patient debtor can make a payment online at the subscriber's office in which the patient debtor is seeking treatment; under this option the patient debtor can use a system web portal with is coupled to and provides access to the transaction engine 308. Under yet another payment option, the patient debtor can contact the subscriber owning the outstanding balance and make arrangements for direct payment of the subscriber (e.g., check, cash, credit card, financing, etc.) 310. When the patient debtor makes a payment via credit card or online at the subscriber's office in which the patient debtor is seeking treatment, the system disburses the amount paid by the patient debtor to the subscriber owning the patient debtor balance, less a transaction fee.

In an alternative embodiment, the service provider grants the patient debtor access to the system website by assigning the patient debtor a website access key code. Using this key code, the patient debtor is granted access to the website. On the entry page of the website, a transaction button can be clicked that takes the patient to the transaction engine. The database information is displayed on the transaction page. The patient debtor can select a payment method. If the payment is made by credit card, the patient debtor enters their credit card number, expiration data, credit card security code, and amount of payment. The credit card information is processed and a page confirms the amount to be paid and any outstanding balance remaining after the payment is applied. After payment is made, the transaction engine disburses the payment to the subscriber to which the balance is owed less a transaction fee. In addition, the database is updated to reflect the payment.

Regarding the data of delinquent patients provided under the embodiments herein, it is noted that a reporting company, such as the service provider described herein, that provides information to health service providers regarding an individual's health services liabilities likely falls within the scope of the Fair Credit Reporting Act ("FCRA"). As such, the FCRA restricts a reporting agency's ability to report health care related data, effectively limiting the content of such reports to the existence of outstanding account balances relating to the provision of medical services.

Consider the example case of a patient requesting services from a physician. Prior to accepting the patient or establishing any relationship with the patient, the physician requests information from the service provider regarding an individual's outstanding health services accounts. The physician subsequently uses the information to determine the patient's ability to pay and, based on the information, the physician may decide to demand cash payment prior to treatment or provide treatment with the patient's commitment to pay at a later date. In either case, the physician has used the information to determine whether to issue the patient credit as the term in defined in the FCRA (e.g., §603(r)(5)).

The FCRA governs the conditions under which the service provider may provide a patient's or consumer's health related account history to requesting health care providers. In more general terms, the FCRA governs a consumer reporting agency's ability to issue consumer reports (e.g., §603(f)). Under the FCRA, a consumer reporting agency is broadly defined to include any person who collects credit information for the purpose of providing consumer reports. The term consumer report constitutes any communication generally related to an individual's credit worthiness and used as a factor in determining such individual's eligibility for credit (e.g., §603(d)).

The service provider must comply with the FCRA in providing physicians or other health care providers consumer data. The FCRA generally authorizes a consumer reporting agency (i.e., the service provider) to provide consumer reports to a person that (in the reasonable belief of the issuing party) intends to use the information with respect to a credit transaction involving the consumer (e.g., §604(a)(3)(A)) or an otherwise legitimate business need in a business transaction initiated by the consumer (e.g., §604(a)(3)(F)(i)).

However, the FCRA aggressively protects consumer medical data and imposes strict requirements upon a consumer agency's use and dissemination of medical data. In particular, the FCRA specifically excludes certain medical information from consumer reports unless expressly authorized under the statute. Without consumer consent, the FCRA restricts the reporting of medical information to general transaction and account balance data using codes that do not disclose any service provider or the nature of the services themselves (e.g., §604(g)). In addition, the FCRA prohibits the reporting of the name, address and telephone number of any medical information furnisher unless the information is reported using codes that do not provide sufficient information to infer the identity of the health care provider or nature of the services (e.g., §605(a)(6)). The embodiments described herein, when in actual use, comply with the FCRA as to the disclosure of patient financial information.

In an embodiment, a disclosure is provided (e.g., electronic disclosure form) to a patient by a subscriber at the time of patient intake. The disclosure, which would require acceptance by the patient, performs at least one of the following, but is not so limited: authorizes a subscriber to enter patient information into the system; authorizes a subscriber to access the system database to determine if the patient is a patient debtor.

An example of the system of an embodiment for tracking financially delinquent patients and notifying healthcare providers of financially delinquent patients is provided below. The system includes a platform, application and/or database for use in the medical/healthcare industry, for example, to facilitate immediate review of a proposed patient's prior negative payment history with healthcare providers. The healthcare providers include, but are not limited to, physicians, clinics, hospitals, imaging centers, physical therapists, dentists and orthodontists. The system provides near-immediate financial payment history to healthcare providers in order to help the healthcare providers facilitate a timely decision whether to treat a patient on credit, or require some form of pre-payment. Through the use of the system, each subscribing healthcare provider likely collects a large percentage of the income owed to the facility, without the need for outsourcing collection of bad debts.

The database of an embodiment, while allowing another subscriber to determine who the creditors are relative to a patient's debt, does not include any identifying information relative to the nature of the medical treatment. For instance, a clinic that treats virtually all HIV or drug addicts is not made public to those who access the system database. Only the delinquent patient/guarantor can determine the identity of the creditor who is owed money. The only information in the database of an embodiment is the number of the provider, social security number of the patient/guarantor, the amount of money currently owed, and the date that this debt was introduced into the database. Date of treatment is not an issue, as a healthcare provider can choose not to put delinquent debt into a database until certain efforts of collection by healthcare provider have already been exhausted. The entry of bad debt is left to the complete discretion of the healthcare provider.

In order to use or access the services offered, the system provides a healthcare provider with two methods under which they can access the database, a billing software method and a manual method. Under both methods, the healthcare provider becomes a subscriber to the system, and is provided a subscriber number that is unique to this healthcare provider. The membership includes payment of a membership fee (e.g., annual fee, monthly fee, periodic fee, etc.) of a pre-specified amount. The healthcare provider, under an embodiment, agrees to the terms of the contract agreement via an internet contract/subscriber agreement, for example, where the contract establishes the terms, conditions and obligations of both the healthcare provider and services provided under the system.

Under the billing software model, the database information of an embodiment is accessed and updated automatically through subscriber billing software. This software provides an automated review of a proposed patient/guarantor's negative payment history at the time a newly admitting patient is screened by a healthcare provider or at any time prior to treatment of the patient. Upon entering the name and social security number of the patient, the system facilitates a review of the database for any current negative payment history. If a current indebtedness is identified in the database, then this information is provided to the healthcare provider and the delinquent patient/guarantor. Based on any history of delinquency, the healthcare provider then makes a decision whether it requires advance payment from the patient prior to performing any medical treatment.

FIG. 4 is an example of patient information of the system database, under an embodiment. In this example, the patient information includes, but is not limited to, the following: a healthcare provider number (e.g., "246810") of the treatment provider; the patient debtor Social Security number (e.g., "123-45-6789") or other patient identification number; the data the patient information was entered into the database (e.g., "17 Sep. 10"); an amount of the patient debt (e.g., "$750.00); an amount of interest accrued on the patient debt amount (e.g., none in this example); and a total amount of patient debt (e.g., the total of the patient debt and the interest accrued on the patient debt (e.g., "$750.00)).

Further, the patient/guarantor can then be provided a report or printout reflecting the nature of the negative payment entry/entries, with information on how to immediately remove this entry upon payment of the indebtedness by facilitating payment. Under an embodiment, when receiving payment from the patient for services previously rendered by a subscriber, the system makes pro-rata payments to the treating healthcare provider, less a collection fee as set out in the contract/subscriber agreement. All negative payment information is likewise automatically entered into the database, or amended in the database, via an automated information exchange between the system and each respective healthcare provider using the medical billing software described above.

For those healthcare providers who do not own, use or lease billing software which can access the database of the system, manual access to the database is enabled after becoming a subscriber, paying the membership fee, and agreeing to the contract/membership agreement terms. Under the manual method, the healthcare provider updates its financially delinquent patients within the database on a periodic basis (e.g., weekly, monthly, quarterly, etc.). The healthcare provider is provided access to the database by accessing an interne website and entering a secure pass code. Upon gaining access to the system, the healthcare provider enters the name and social security number of the applicant/guarantor/patient, at which time this party's negative payment history (if any) is presented on a display. The negative payment display is then copied and provided to the guarantor/patient, along with contact information to facilitate removal of the negative entry upon payment.

The system provides the opportunity for any subscriber to collect a debt on behalf of any other healthcare provider subscriber that is owed money. Immediate payment of bad debt by a creditor has the affect of "clearing" this negative entry in the system database upon receipt of payment. This immediate removal of the negative entry provides the debtor the incentive to make payment, as he/she will receive an immediate benefit, unlike traditional credit databases. Thus, membership authorizes the system to act as a collection company. Payment to the subscribers is split on a pro rata basis, should the debt not be cleared entirely. Pursuant to the subscriber agreement, the system is authorized to retain as a service fee, for example, a pre-specified percentage of funds collected in this manner.

Embodiments described herein include a method comprising providing a platform with a database that includes identifying data of patient debtors. The patient debtors are patients who have been financially delinquent in at least one healthcare transaction with at least one of a plurality of healthcare providers. The identifying data includes patient identification data and financial data of the at least one healthcare transaction. The method of an embodiment comprises receiving at least one fee from a subscriber and, in response, enabling the subscriber to electronically access the platform. The subscriber is a healthcare provider of the plurality of healthcare providers. The method of an embodiment comprises providing the identifying data of at least one patient debtor to the subscriber via the platform. The method of an embodiment comprises receiving at the platform new identifying data of at least one patient debtor from a contributing subscriber of the plurality of healthcare providers. The new identifying data of the at least one patient debtor is identifying data of at least one of a new patient debtor and a new healthcare transaction of an existing patient debtor corresponding to at least one healthcare transaction with the contributing subscriber. The method of an embodiment comprises automatically applying a discount to the at least one fee of the contributing subscriber in response to the receiving of the new identifying data.

Embodiments described herein include a method comprising: providing a platform with a database that includes identifying data of patient debtors, wherein the patient debtors are patients who have been financially delinquent in at least one healthcare transaction with at least one of a plurality of healthcare providers, wherein the identifying data includes patient identification data and financial data of the at least one healthcare transaction; receiving at least one fee from a subscriber and, in response, enabling the subscriber to electronically access the platform, wherein the subscriber is a healthcare provider of the plurality of healthcare providers; providing the identifying data of at least one patient debtor to the subscriber via the platform; receiving at the platform new identifying data of at least one patient debtor from a contributing subscriber of the plurality of healthcare providers, wherein the new identifying data of the at least one patient debtor is identifying data of at least one of a new patient debtor and a new healthcare transaction of an existing patient debtor corresponding to at least one healthcare transaction with the contributing subscriber; and automatically applying a discount to the at least one fee of the contributing subscriber in response to the receiving of the new identifying data.

The at least one fee of an embodiment comprises a subscription fee.

The at least one fee of an embodiment comprises an access fee that is assessed upon accessing the platform.

The at least one fee of an embodiment comprises at least one of a subscription fee and an access fee, wherein the access fee is assessed upon accessing the platform.

The method of an embodiment comprises securing the identifying data from access by unauthorized entities.

The financial data of an embodiment includes a summary of debits and withdrawals from an account of each of the patient debtors.

The method of an embodiment comprises providing each subscriber via the platform a periodic report that includes the summary.

The periodic report of an embodiment identifies each patient debtor who has been delinquent in financial dealings with other healthcare providers.

The method of an embodiment comprises generating an amount of the discount in proportion to an amount of indebtedness reported in the at least one electronic report.

The receiving at the platform of the identifying data of at least one patient debtor of an embodiment comprises the contributing subscriber adding the identifying data to the database.

The patient identification data of an embodiment comprises at least one of name, address, date of birth, and social security number.

The financial data of an embodiment includes an unpaid amount corresponding to the at least one healthcare transaction.

The method of an embodiment comprises removing the unpaid amount from the database in response to receiving payment of the unpaid amount.

The financial data of an embodiment includes insurance data.

The financial data of an embodiment includes name of healthcare provider creditor.

The financial data of an embodiment includes location of the healthcare provider corresponding to the at least one healthcare transaction.

The method of an embodiment comprises receiving a payment corresponding to a patient debtor and a healthcare transaction for which the patient debtor is delinquent. The method of an embodiment comprises crediting the patient debtor with the payment. The method of an embodiment comprises revising the financial data corresponding to the healthcare transaction to reflect the payment.

The method of an embodiment comprises crediting a healthcare provider corresponding to the healthcare transaction with an amount representing the payment.

The amount of an embodiment representing the payment is discounted.

Embodiments described herein include a system comprising a platform coupled to a database. The database includes identifying data of patient debtors who have been financially delinquent in at least one healthcare transaction with at least one of a plurality of healthcare providers. The identifying data includes patient identification data and financial data of the at least one healthcare transaction. The system of an embodiment comprises at least one remote device coupled to the platform via a network. The at least one remote device of an embodiment enables electronic access to the platform for a subscriber and receives the identifying data of at least one patient debtor from the platform. The subscriber is a healthcare provider of the plurality of healthcare providers who has paid at least one fee. The at least one remote device of an embodiment enables electronic access to the platform for a contributing subscriber and transfers to the platform new identifying data of at least one patient debtor. The new identifying data of the at least one patient debtor is identifying data of at least one of a new patient debtor and a new healthcare transaction of an existing patient debtor corresponding to at least one healthcare transaction with the contributing subscriber. The platform of an embodiment automatically applies a discount to the at least one fee of the contributing subscriber in response to the receiving of the new identifying data.

Embodiments described herein include a system comprising: a platform coupled to a database, wherein the database includes identifying data of patient debtors who have been financially delinquent in at least one healthcare transaction with at least one of a plurality of healthcare providers, wherein the identifying data includes patient identification data and financial data of the at least one healthcare transaction; and at least one remote device coupled to the platform via a network; wherein the at least one remote device enables electronic access to the platform for a subscriber and receives the identifying data of at least one patient debtor from the platform, wherein the subscriber is a healthcare provider of the plurality of healthcare providers who has paid at least one fee; wherein the at least one remote device enables electronic access to the platform for a contributing subscriber and transfers to the platform new identifying data of at least one patient debtor, wherein the new identifying data of the at least one patient debtor is identifying data of at least one of a new patient debtor and a new healthcare transaction of an existing patient debtor corresponding to at least one healthcare transaction with the contributing subscriber; wherein the platform automatically applies a discount to the at least one fee of the contributing subscriber in response to the receiving of the new identifying data.

The at least one fee of an embodiment comprises a subscription fee.

The at least one fee of an embodiment comprises an access fee that is assessed upon accessing the platform.

The at least one fee of an embodiment comprises at least one of a subscription fee and an access fee, wherein the access fee is assessed upon accessing the platform.

The platform of an embodiment secures the identifying data from access by unauthorized entities.

The financial data of an embodiment includes a summary of debits and withdrawals from an account of each of the patient debtors.

The platform of an embodiment provides a periodic report to each subscriber that includes the summary, wherein the periodic report identifies each patient debtor who has been delinquent in financial dealings with other healthcare providers.

The platform of an embodiment automatically generates an amount of the discount in proportion to an amount of indebtedness reported in the at least one electronic report.

The patient identification data of an embodiment comprises at least one of name, address, date of birth, and social security number.

The financial data of an embodiment includes an unpaid amount corresponding to the at least one healthcare transaction.

The platform of an embodiment automatically removes the unpaid amount from the database in response to receiving payment of the unpaid amount.

The financial data of an embodiment includes insurance data.

The financial data of an embodiment includes name of healthcare provider creditor.

The financial data of an embodiment includes location of the healthcare provider corresponding to the at least one healthcare transaction.

A payment of an embodiment is received at the platform corresponding to a patient debtor and a healthcare transaction for which the patient debtor is delinquent and, in response, the platform automatically credits the patient debtor with the payment and revises the financial data corresponding to the healthcare transaction to reflect the payment.

The platform of an embodiment automatically credits a healthcare provider corresponding to the healthcare transaction with an amount representing the payment.

The platform of an embodiment automatically discounts the payment and generates the amount representing the payment.

Embodiments described herein comprise a method of notifying health care providers of patients who have been financially delinquent in one or more patient care related transactions with another health care provider, the method comprising: a service company providing an Internet website having a database that includes information identifying patient debtors who have been financially delinquent in one or more patient care related transactions with a health care provider; enabling only authorized subscribers to access the database via the website; the subscribers paying a membership fee to the service company; a subscriber accessing the database to verify which patient debtors have been financially risky in dealing with other subscribers; a subscriber paying a fee each time that the database is accessed; a subscriber reporting to the service company information that identifies a particular patient debtor as a financial risk, said information including an amount of an unpaid indebtedness for health care relates services rendered by a subscriber; and the subscriber obtaining a discount that lowers the membership fee or the access fee each time the subscriber reports information evidencing that a particular patient debtor presents a financial risk for other subscribers.

The website of an embodiment provides security that protects the name of the subscriber and the name of the patient debtor from unauthorized entities.

The information of an embodiment includes the amount of an unpaid indebtedness.

Each subscriber of an embodiment has a unique access code that enables access to the website.

The information of an embodiment is removed from the database within a time after the patient debtor has paid the indebtedness.

The database of an embodiment includes monthly summary of debits and withdrawals from an account for a plurality of patients.

Each subscriber of an embodiment receives a monthly report that includes the summary.

The report of an embodiment identifies each patient debtor who has been delinquent in financial dealings with other health care providers.

The discount of an embodiment is in proportion to the amount of the indebtedness reported.

Embodiments described herein comprise a method of notifying subscriber health care providers of patient related information indicating a past failure to pay for health care related services rendered by another health care provider, the method comprising: a service company providing an Internet website having a database that includes information identifying patient debtors who have been financially delinquent in one or more patient care related transactions with a health care provider; enabling only authorized subscribers to access the database via the website; the subscribers paying fees to the service company; a subscriber accessing the database to verify which patient debtors have been financially risky in dealing with other subscribers; a subscriber reporting to the service company information that identifies a particular patient debtor as a financial risk, said information including an amount of an unpaid indebtedness for health care relates services rendered by a subscriber; and the subscriber obtaining a discount that lowers the fee each time the subscriber reports information evidencing that a particular patient debtor presents a financial risk for other subscribers.

Embodiments described herein comprise a method of notifying health care providers of patients who have been financially delinquent in one or more patient care related transactions with another health care provider, the method comprising: a service company providing an Internet website having a database that includes information identifying patient debtors who have been financially delinquent in one or more patient care related transactions with one or more health care provider; enabling only authorized subscribers to access the database via the website; the subscribers paying a membership fee to the service company; a subscriber accessing the database to verify which patient debtors have been financially risky in dealing with other subscribers; a subscriber paying a fee each time that the database is accessed; a subscriber reporting to the service company information that identifies a particular patient debtor as a financial risk, said information including an amount of an unpaid indebtedness for health care relates services rendered by a subscriber; and the subscriber obtaining a discount that lowers the membership fee or the access fee each time the subscriber reports information evidencing that a particular patient debtor presents a financial risk for other subscribers.

The website of an embodiment provides security that protects the name of the subscriber and the name of the patient debtor from unauthorized entities.

The information of an embodiment is added to the website by the subscriber.

Each subscriber of an embodiment has a unique access code that enables access to the website.

The information of an embodiment is removed from the database within a time after the patient debtor has paid the indebtedness.

The database of an embodiment includes monthly summary of debits and withdrawals from an account for a plurality of patients.

Each subscriber of an embodiment receives a monthly report that includes the summary.

The report of an embodiment identifies each patient debtor who has been delinquent in financial dealings with other health care providers.

The discount of an embodiment is in proportion to the amount of the indebtedness reported.

Embodiments described herein comprise a method of notifying subscriber health care providers of patient related information indicating a past failure to pay for health care related services rendered by another health care provider, the method comprising: a service company providing an Internet website having a database that includes information identifying patient debtors who have been financially delinquent in one or more patient care related transactions with a health care provider; enabling only authorized subscribers to access the database via the website; the subscribers paying fees to the service company; a subscriber accessing the database to verify which patient debtors have been financially risky in dealing with other subscribers; a subscriber reporting to the service company information that identifies a particular patient debtor as a financial risk, said information including at least one of name of patient, date of birth of patient, social security number of patient, amount that patient did not compensate to healthcare provider, or amount that is still owed to the healthcare provider, whether the patient had health insurance (possibly an indicator if the patient was unable to meet his or her "co-payment" obligation), name of healthcare provider creditor, town or location of healthcare provider; and the subscriber obtaining a discount that lowers the fee each time the subscriber reports information evidencing that a particular patient debtor presents a financial risk for other subscribers.

In the description above, numerous specific details are introduced to provide a thorough understanding of, and enabling description for, embodiments of the systems and methods. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods is not intended to be exhaustive or to limit the systems and methods described to the precise form disclosed. While specific embodiments of, and examples for, the systems and methods are described herein for illustrative purposes, various equivalent modifications are possible within the scope of other systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

What is claimed is:

1. A method comprising:

providing a platform with a database that includes identifying data of patient debtors, wherein the patient debtors are patients who have been financially delinquent in at least one healthcare transaction with at least one of a plurality of healthcare providers, wherein each healthcare provider is independent of each other healthcare provider of the plurality of healthcare providers, wherein the identifying data includes patient identification data and financial data of the at least one healthcare transaction;

receiving at least one fee from a subscriber and, in response, enabling the subscriber to electronically access the platform, wherein the subscriber is a healthcare provider of the plurality of healthcare providers;

providing the identifying data of at least one patient debtor to the subscriber via the platform;

receiving at the platform new identifying data of at least one patient debtor from a contributing subscriber of the plurality of healthcare providers, wherein the new identifying data of the at least one patient debtor is identifying data of at least one of a new patient debtor and a new healthcare transaction of an existing patient debtor corresponding to at least one healthcare transaction with the contributing subscriber;

automatically applying a discount to the at least one fee of the contributing subscriber in response to the receiving of the new identifying data; and automatically crediting an account of a first healthcare provider of the plurality of healthcare providers in response to receiving payment from a patient debtor, wherein the payment is received at any of the plurality of healthcare providers and corresponds to a healthcare transaction in which the patent debtor received treatment from the first healthcare provider and for which the patient debtor is financially delinquent.

2. The method of claim 1, wherein the at least one fee comprises a subscription fee.

3. The method of claim 1, wherein the at least one fee comprises an access fee that is assessed upon accessing the platform.

4. The method of claim 1, wherein the at least one fee comprises at least one of a subscription fee and an access fee, wherein the access fee is assessed upon accessing the platform.

5. The method of claim 1, comprising securing the identifying data from access by unauthorized entities.

6. The method of claim 1, wherein the financial data includes a summary of debits and withdrawals from an account of each of the patient debtors.

7. The method of claim 6, comprising providing each subscriber via the platform a periodic report that includes the summary.

8. The method of claim 7, wherein the periodic report identifies each patient debtor who has been delinquent in financial dealings with other healthcare providers.

9. The method of claim 1, comprising generating an amount of the discount in proportion to an amount of indebtedness reported in the at least one electronic report.

10. The method of claim 1, wherein the receiving at the platform of the identifying data of at least one patient debtor comprises the contributing subscriber adding the identifying data to the database.

11. The method of claim 1, wherein the patient identification data comprises at least one of name, address, date of birth, and social security number.

12. The method of claim 1, wherein the financial data includes an unpaid amount corresponding to the at least one healthcare transaction.

13. The method of claim 12, comprising removing the unpaid amount from the database in response to receiving payment of the unpaid amount.

14. The method of claim 1, wherein the financial data includes insurance data.

15. The method of claim 1, wherein the financial data includes name of healthcare provider creditor.

16. The method of claim 1, wherein the financial data includes location of the healthcare provider corresponding to the at least one healthcare transaction.

17. The method of claim 1, comprising:
receiving a payment corresponding to a patient debtor and a healthcare transaction for which the patient debtor is delinquent;
crediting the patient debtor with the payment; and
revising the financial data corresponding to the healthcare transaction to reflect the payment.

18. The method of claim 17, comprising crediting a healthcare provider corresponding to the healthcare transaction with an amount representing the payment.

19. The method of claim 18, wherein the amount representing the payment is discounted.

20. A system comprising:
a platform coupled to a database, wherein the database includes identifying data of patient debtors who have been financially delinquent in at least one healthcare transaction with at least one of a plurality of healthcare providers, wherein each healthcare provider is independent of each other healthcare provider of the plurality of healthcare providers, wherein the identifying data includes patient identification data and financial data of the at least one healthcare transaction; and
at least one remote device coupled to the platform via a network;
wherein the at least one remote device enables electronic access to the platform for a subscriber and receives the identifying data of at least one patient debtor from the platform, wherein the subscriber is a healthcare provider of the plurality of healthcare providers who has paid at least one fee;
wherein the at least one remote device enables electronic access to the platform for a contributing subscriber and transfers to the platform new identifying data of at least one patient debtor, wherein the new identifying data of the at least one patient debtor is identifying data of at least one of a new patient debtor and a new healthcare transaction of an existing patient debtor corresponding to at least one healthcare transaction with the contributing subscriber;
wherein the platform automatically applies a discount to the at least one fee of the contributing subscriber in response to the receiving of the new identifying data;
wherein the platform automatically credits an account of a first healthcare provider of the plurality of healthcare providers in response to receiving payment from a patient debtor, wherein the payment is received at any of the plurality of healthcare providers and corresponds to a healthcare transaction in which the patent debtor received treatment from the first healthcare provider and for which the patient debtor is financially delinquent.

21. The system of claim 20, wherein the at least one fee comprises a subscription fee.

22. The system of claim 20, wherein the at least one fee comprises an access fee that is assessed upon accessing the platform.

23. The system of claim 20, wherein the at least one fee comprises at least one of a subscription fee and an access fee, wherein the access fee is assessed upon accessing the platform.

24. The system of claim 20, wherein the platform secures the identifying data from access by unauthorized entities.

25. The system of claim 20, wherein the financial data includes a summary of debits and withdrawals from an account of each of the patient debtors.

26. The system of claim 25, wherein the platform provides a periodic report to each subscriber that includes the summary, wherein the periodic report identifies each patient debtor who has been delinquent in financial dealings with other healthcare providers.

27. The system of claim 20, wherein the platform automatically generates an amount of the discount in proportion to an amount of indebtedness reported in the at least one electronic report.

28. The system of claim 20, wherein the patient identification data comprises at least one of name, address, date of birth, and social security number.

29. The system of claim 20, wherein the financial data includes an unpaid amount corresponding to the at least one healthcare transaction.

30. The system of claim 29, wherein the platform automatically removes the unpaid amount from the database in response to receiving payment of the unpaid amount.

31. The system of claim 20, wherein the financial data includes insurance data.

32. The system of claim 20, wherein the financial data includes name of healthcare provider creditor.

33. The system of claim 20, wherein the financial data includes location of the healthcare provider corresponding to the at least one healthcare transaction.

34. The system of claim 20, wherein a payment is received at the platform corresponding to a patient debtor and a healthcare transaction for which the patient debtor is delinquent and, in response, the platform automatically credits the patient debtor with the payment and revises the financial data corresponding to the healthcare transaction to reflect the payment.

35. The system of claim 34, wherein the platform automatically credits a healthcare provider corresponding to the healthcare transaction with an amount representing the payment.

36. The system of claim 35, wherein the platform automatically discounts the payment and generates the amount representing the payment.

* * * * *